(12) United States Patent
Yang et al.

(10) Patent No.: US 9,500,221 B2
(45) Date of Patent: Nov. 22, 2016

(54) TRIPLE LOCKING HOOK CONNECTOR

(71) Applicants: Aerohook Technology Co., Ltd., Taichung (TW); Kai Chieh Yang, Taichung (TW)

(72) Inventors: Kai Chieh Yang, Taichung (TW); Tzu-Sen Lai, Taichung (TW)

(73) Assignees: Aerohook Technology Co., Ltd., Taichung (TW); Kai Chieh Yang, Taichung (TW)

( * ) Notice: Subject to any disclaimer, the term of this patent is extended or adjusted under 35 U.S.C. 154(b) by 0 days.

(21) Appl. No.: 14/668,942

(22) Filed: Mar. 25, 2015

(65) Prior Publication Data

US 2016/0281765 A1     Sep. 29, 2016

(51) Int. Cl.
*F16B 45/02*     (2006.01)
*A63B 29/02*     (2006.01)
*A62B 35/00*     (2006.01)

(52) U.S. Cl.
CPC ........... *F16B 45/02* (2013.01); *A62B 35/0037* (2013.01); *A63B 29/02* (2013.01)

(58) Field of Classification Search
CPC ... A62B 35/0037; A63B 29/02; F16B 45/02; Y10T 24/45366; Y10T 24/4534; Y10T 24/45361
USPC ........... 24/599.1, 599.4, 599.5, 599.6, 599.7, 24/599.8, 599.9, 600.1, 601.1, 601.5, 24/501.7; 294/82.19
See application file for complete search history.

(56) References Cited

U.S. PATENT DOCUMENTS

| | | | | | |
|---|---|---|---|---|---|
| 4,528,729 A | * | 7/1985 | Schmidt | ................. | F16B 45/02 24/599.4 |
| 4,539,732 A | * | 9/1985 | Wolner | ...................... | B66C 1/36 24/600.2 |
| 4,977,647 A | * | 12/1990 | Casebolt | ................... | B66C 1/36 24/599.5 |
| 5,361,464 A | * | 11/1994 | Bunnell | ................. | F16B 45/02 24/599.5 |
| 5,735,025 A | * | 4/1998 | Bailey | .................... | F16B 45/02 24/600.1 |
| 5,896,630 A | * | 4/1999 | Smith | .................... | F16B 45/02 24/600.1 |
| 6,283,524 B1 | * | 9/2001 | Simond | .................... | A62B 1/04 24/600.1 |
| 6,718,601 B1 | * | 4/2004 | Choate | ................... | F16B 45/02 24/599.5 |
| 6,832,417 B1 | * | 12/2004 | Choate | ..................... | B66C 1/36 24/599.5 |
| 7,444,723 B2 | * | 11/2008 | Lin | ......................... | F16B 45/02 24/600.1 |
| 7,922,220 B2 | * | 4/2011 | Coulombe | ............. | F16B 45/02 24/600.1 |
| 8,007,015 B2 | * | 8/2011 | Coulombe | ............. | F16B 45/02 24/600.1 |
| 8,015,676 B1 | * | 9/2011 | Choate | ................... | F16B 45/02 24/599.5 |

(Continued)

*Primary Examiner* — Robert J Sandy
*Assistant Examiner* — Rowland Do
(74) *Attorney, Agent, or Firm* — Raymond Y. Chan; David and Raymond Patent Firm

(57) ABSTRACT

A triple locking hook connector includes a hook, a locking bar, a first spring, a controlling shaft, and a second spring. The hook has an axle hole and a first groove on an end of a hook opening, and has a spacing portion on the other end of the hook opening. An edge of an end of the locking bar has a first bolt. The first spring is to drive a first bolt to keep at the first position and to drive the other end of the locking bar to remain in the spacing portion. The controlling shaft joins the axle hole via a main axle to restrict the first bolt in the first position and to be driven by a second spring to stay at the third position to ensure the locking bar shutting the hook opening.

16 Claims, 8 Drawing Sheets

(56) References Cited

U.S. PATENT DOCUMENTS

| | | | | |
|---|---|---|---|---|
| 2005/0193531 A1* | 9/2005 | Chang | F16B 45/02 24/600.2 |
| 2007/0062014 A1* | 3/2007 | Casebolt | F16B 45/02 24/600.1 |
| 2011/0113603 A1* | 5/2011 | Yang | F16B 45/02 24/599.6 |
| 2012/0042487 A1* | 2/2012 | Yang | F16B 45/02 24/599.5 |
| 2012/0102688 A1* | 5/2012 | Yang | F16B 45/02 24/600.1 |
| 2012/0210542 A1* | 8/2012 | Yang | F16B 21/165 24/369 |
| 2013/0025095 A1* | 1/2013 | Yang | F16B 45/02 24/599.5 |
| 2013/0160252 A1* | 6/2013 | Lin | F16B 45/02 24/601.5 |
| 2013/0219673 A1* | 8/2013 | Perner | F16B 45/02 24/375 |
| 2014/0110956 A1* | 4/2014 | Lin | F16B 45/02 294/82.2 |
| 2014/0245576 A1* | 9/2014 | Perner | F16B 45/02 24/600.1 |
| 2014/0373319 A1* | 12/2014 | Lin | F16B 45/02 24/599.5 |
| 2016/0101302 A1* | 4/2016 | Perner | F16B 45/02 24/573.11 |

* cited by examiner

TRIPLE LOCKING HOOK CONNECTOR

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention provides a triple locking hook connector, in particular, a new technique that a hook hole can only be opened by sequentially operating a controlling shaft to release a locking bar, pulling the locking bar out of a spacing portion, and then forcing the locking bar to turn toward the hook hole. The concern of unhooking can be further reduced to the lowest with this whole new design.

2. Description of Related Arts

In rock climbing, mountain climbing, building construction, and the like contexts that require ascending and descending movements, safety of the personnel has to rely on the safety hooks and safety belts.

According to the most advancing safety hook disclosure by U.S. Pat. No. 8,117,721, such conventional case, however, still has the following disadvantages to be improved.

First, this prior case simply controls whether a locking bar can turn to open a hook hole via the operation on a controlling shaft, which structure still belongs to the scope of double locking hook connector and, therefore, has a misgiving of unhooking due to an unintended contact to the controlling shaft under operating circumstances of the complicated upper air. As a result, this prior case can hardly construct a completely secure protection.

Second, when the locking bar of this prior case is under side bump, it can only simply transfer the bumping force to the hook, which easily converges the stress and causes a great restriction on the length of the locking bar, so the hook opening cannot correspondingly be enlarged. As a result, when a user is proceeding to hook or unhook, either action can be finished at once, which increases trouble with the operation.

The present invention is invented for overcoming the abovementioned disadvantages of the conventional case after detailed and diligent research and development by the inventor of the present invention.

SUMMARY OF THE PRESENT INVENTION

The present invention provides a triple locking hook connector which comprises:

a hook comprising a hook hole penetrated thereof, wherein a side of the hook has a hook opening linking through the inside and outside of the hook hole, wherein the hook has a first groove, an axle hole penetratingly on an edge of an end of the hook opening, and a spacing portion on an edge of the other end of the hook opening;

a locking bar having a first bolt on an edge of an end thereof, wherein the first bolt is able to move along the first groove and, in such manner, to shift between a first position and a second position, wherein as the first bolt moves to a first position, the other end of the locking bar will be positioned at the spacing portion to close the hook opening. As the first bolt moves to a second position, the other end of the locking bar can be positioned at a place out of the spacing portion;

a first spring driving the first bolt to keep at the first position and to drive the other end of the locking bar to remain positioned in the spacing portion;

a controlling shaft having a buckling portion and joining the axle hole via a main axle, which, as the controlling shaft is swung to a third position, allows the controlling shaft to restrict the first bolt at the first position; and a second spring to drive the controlling shaft to stay at the third position, so as to ensure that the locking bar shuts the hook opening, wherein for opening the hook opening, the controlling shaft will be driven to swing to a fourth position to allow the locking bar to be pulled to move the first bolt to the second position, which then induces the locking bar to turn toward the hook hole and composes a three-part mode for opening the hook opening.

Accordingly, the three-part mode for opening the hook opening of the present invention is certainly able to further enhance the safety of use of the present invention, which is enough for dealing with the complicated operating circumstances of the upper air and reducing the concern of unhooking caused by unintended contact to the lowest. Besides, when the locking bar that is locking the hook opening is side bumped, the locking bar can pass the stress to the hook through the spacing portion and the first bolt, so the present invention really has an advancement of dispersing stress, which allows the present invention to enlarge the hook opening and lengthen the locking bar in the manner that the requirements for structural safety are also met, so that the operations of hooking and unhooking are made to be more smooth and efficient.

DETAILED DESCRIPTION OF THE PREFERRED EMBODIMENT

Figure 1:
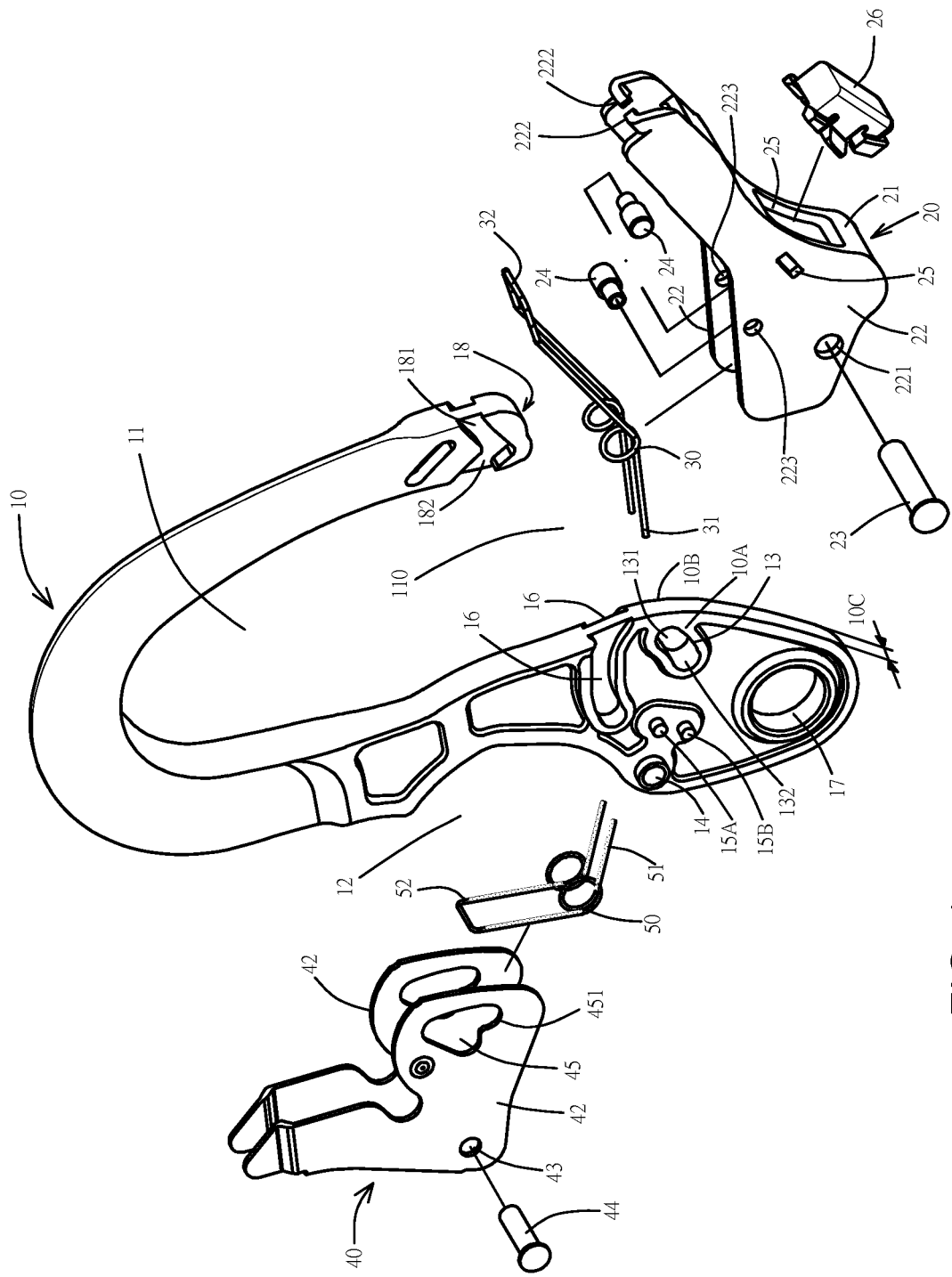
FIG. 1 is an explosive view of the present invention.
Figure 2:
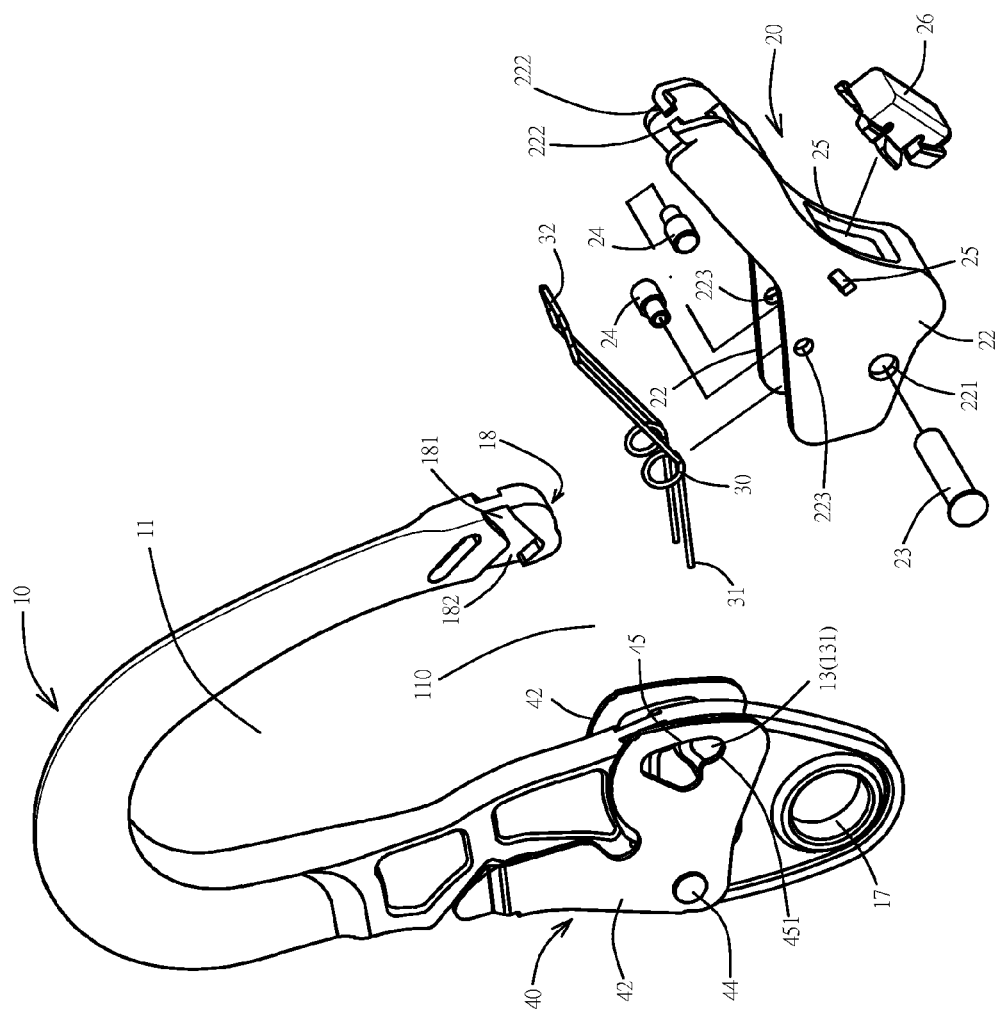
FIG. 2 is a perspective view showing partially assembling a controlling shaft to a hook for the FIG. 1.
Figure 3:
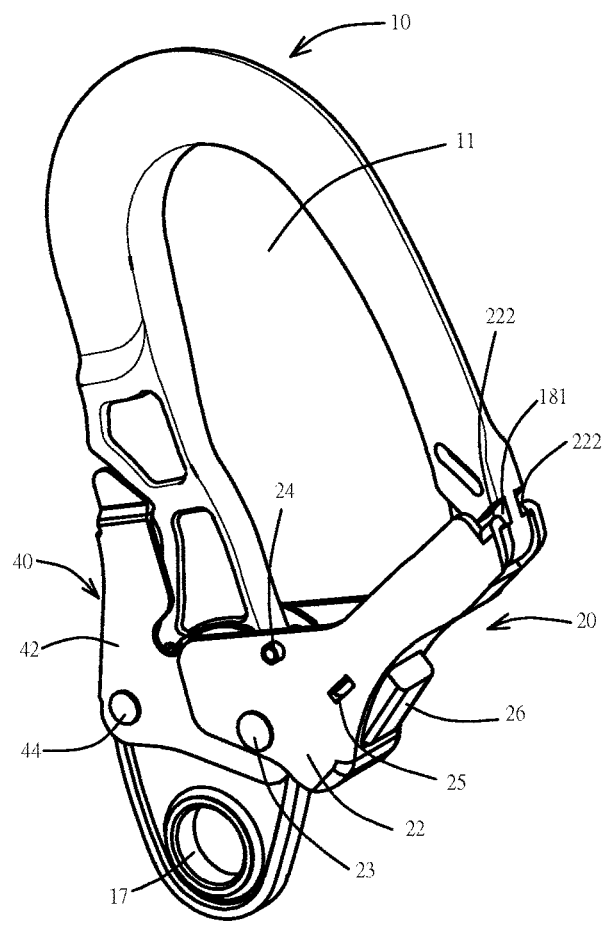
FIG. 3 is an exterior view of the assembly of the present invention.
Figure 4:
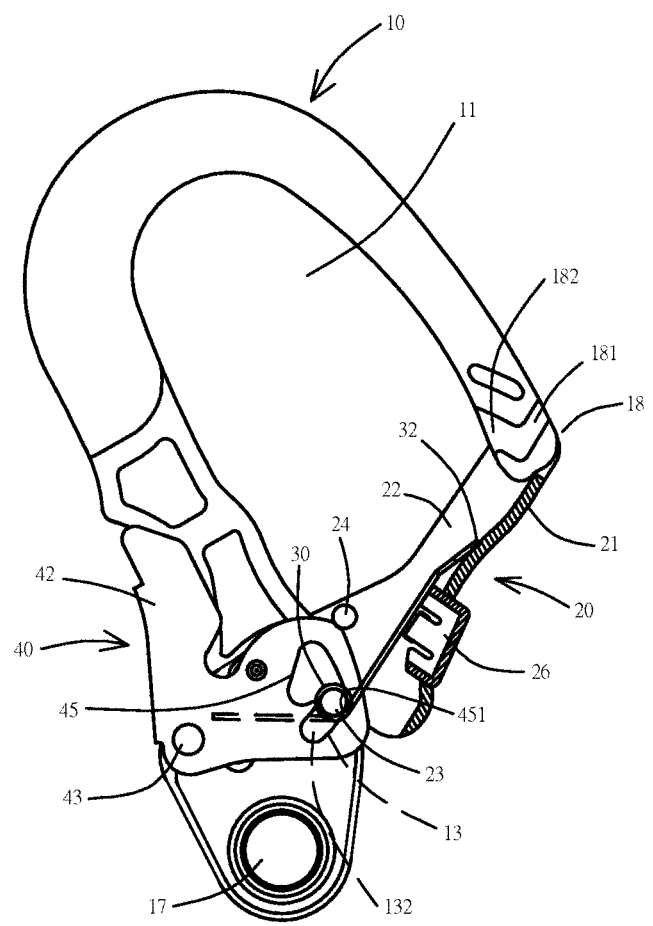
FIG. 4 is a perspective view of a partial section of a locking bar of the assembly of the present invention.
Figure 5:
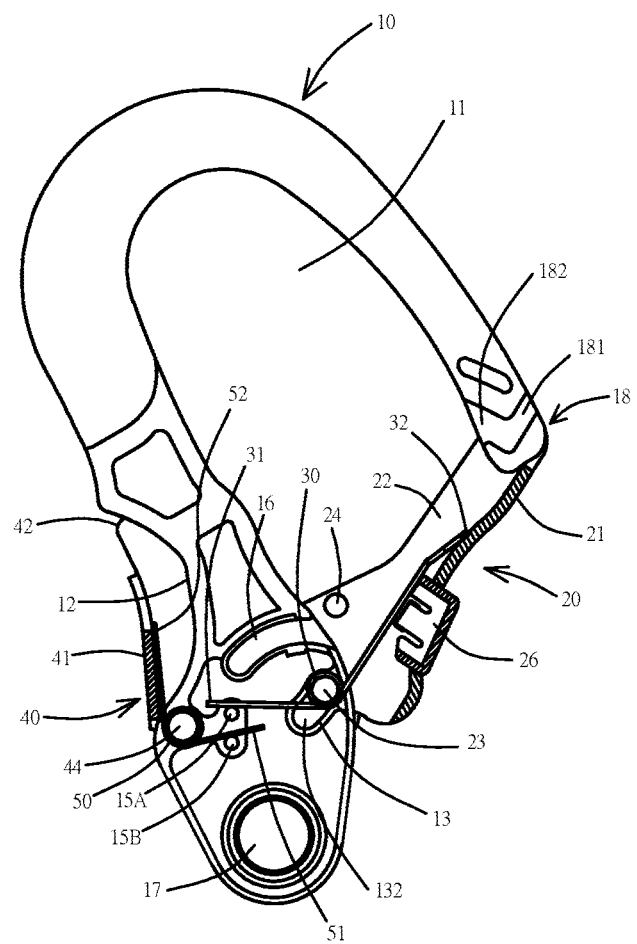
FIG. 5 is a perspective view of partial section of a locking bar and a controlling shaft of the assembly of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Please refer to FIGS. 1 to 8, the present invention comprises the following:

A hook 10 comprises a thickness 10C defined between a front side 10A and a back side 10B. A hook hole 11 penetrates the thickness 10C, wherein a side of the hook 10 has a hook opening 110 linking through the inside and outside of the hook hole 11. The hook 10 dentedly has a containing groove 12 penetrating the thickness 10C on an edge of an end of the hook opening 110. The hook 10 spacingly has an axle hole 14 and a first groove 13 penetrating the thickness 10C on an edge of an end of the hook opening and has a first dowel 15A and a second dowel 15B respectively protruding from the two sides 10A and 10B in between the axle hole 14 and the first groove 13. The first groove 13 is set a first position 131 near the hook opening 110 and a second position 132 away from the hook opening 110. The front 10A and the back 10B of the hook 10 further symmetrically and dentedly has a second groove 16 connecting through the hook hole 11 in a manner that the second position 132 is referred as a center of circle. The bottom of the hook 10 further has a hanging hole 17 penetrating the thickness 10C which is for wearing and engaging safety belt, wherein the two sides 10A and 10B of the hook 10 further dentedly respectively have a spacing portion 18 opposite to an edge of the other end of the hook opening 110 that is formed by a crossing buckling groove 181 and a guiding groove 182. The buckling groove 181 axially matches the first groove 13, while the guiding groove 182 connects the buckling groove 181 to the hook hole 11 in a slant direction.

A locking bar 20 has a locking plate 21 for closing the hook opening 110, wherein the front and back sides of the locking plate 21 further symmetrically and upwardly fold a side plate 22 respectively to form a sectional U-shaped frame. An edge of an end of each said side plate 22 has a first hole 221 connecting to the first groove 13, so as to allow the first hole 221 and the first groove 13 to be passed through by a first bolt 23, so that the locking bar 20 can linkingly move the first bolt 23 in between the first position 131 and the second position 132 along the first groove 13. Free ends of the locking bar 20 on the two side plates 22 foldingly set a block 222 each opposite to each other, wherein when the first bolt 23 is at the first position 131, the block is linked by the locking bar 20 to move via the guiding groove 182 and be positioned in the buckling groove 181 for letting the locking bar 20 lock the hook opening 110, while when the first bolt 23 moves to the second position 132, the locking bar 20 will linkingly move the block 222 in the guiding groove 182, which causes the free end of the locking bar 20 to be under a position to release a spacing portion 18 to allow the locking bar 20 to swing toward the hook hole 11 along the guiding groove 182 to open the hook opening 110. Each of the two side plate 22 further has a second hole 223 respectively for installing a second bolt 24, wherein when the first bolt 23 is at the first position 131, the second bolts 24 will be in the hook hole 11, but when the first bolt 23 is at the second position 132, the two second bolts will be at positions that are relatively capable of entering the second groove 16. When the locking bar 20 swings toward the hook hole 11 in a manner that the second position 132 is referred as a center of circle, the second groove 16 is able to restrict the second bolts 24 for swinging around the second position 132, so as to allow the locking bar 20 to stably open the hook opening 110 without a situation of bumping the wall of the hook hole 11. The locking bar 20 further has an assembling groove 25 each on the locking plate 21 and the two side plate 22, so the assembling groove 25 is able to allow the installation of a flipping portion 26 protruding from the locking plate 21, wherein the flipping portion 26 is for the user to easily pull and turn the locking bar 20.

A first spring 30 circles the first bolt 23 and is extended a first pressure foot 31 flexibly propping on the first dowel 15A and a second pressure foot 32 capable of pushing the locking plate 21 with a predetermined elasticity to allow the first spring 30 to be assembled in between the hook 10 and the locking bar 20 for driving the first bolt 23 to remain in the first position 131 and simultaneously driving the block 222 to remain in the buckling groove 181.

A controlling shaft 40 comprises an end plate 41 matching the thickness 10C, wherein the front and back sides of the end plate 41 symmetrically fold a cover plate 42 respectively, so as to form a sectional U-shaped frame that the end plate 41 is at the outer side of the containing groove 12 and the two cover plates 42 correspondingly insert in between the two side plates 22 and the two sides 10A and 10B of the hook 10 respectively. The two cover plates 42 penetratingly have a third hole 43 in corresponding to the position of the axle hole 14, so as to allow a main axle 44 to pass through and couple the axle hole 14 and the third hole 43 for the controlling shaft 40 to use the main axle 44 to be a center of circle to swing between a third position and a fourth position. The two cover plates 42 symmetrically have a buckling portion 45 of a heart-shaped groove, wherein when both ends of the first bolt 23 are inserted into the buckling portion 45 and when the controlling shaft 40 is at the third position, a hollow groove 451 of a side of the buckling portion 45 can be induced to restrict the first bolt 23 in the first position 131, while when the controlling shaft 40 is at the fourth position, the hollow groove 451 of the buckling portion 45 can be induced to release the first bolt 23, so that the first bolt 23 can move between the first position 131 and the second position 132 along the other side of the buckling portion 45.

A second spring 50 circles two rims of the axle hole 14 and being extended a third pressure foot 51 flexibly propping on the second dowel 15B and a fourth pressure foot 52 capable of pushing the inner side of the end plate 41 with a predetermined elasticity to allow the second spring 50 to be assembled in between the hook 10 and the controlling shaft 50 for driving the controlling shaft 50 to remain in the third position, so as to ensure that the locking bar 20 really stays in the position where the hook opening 110 is locked thereby.

Figure 6:
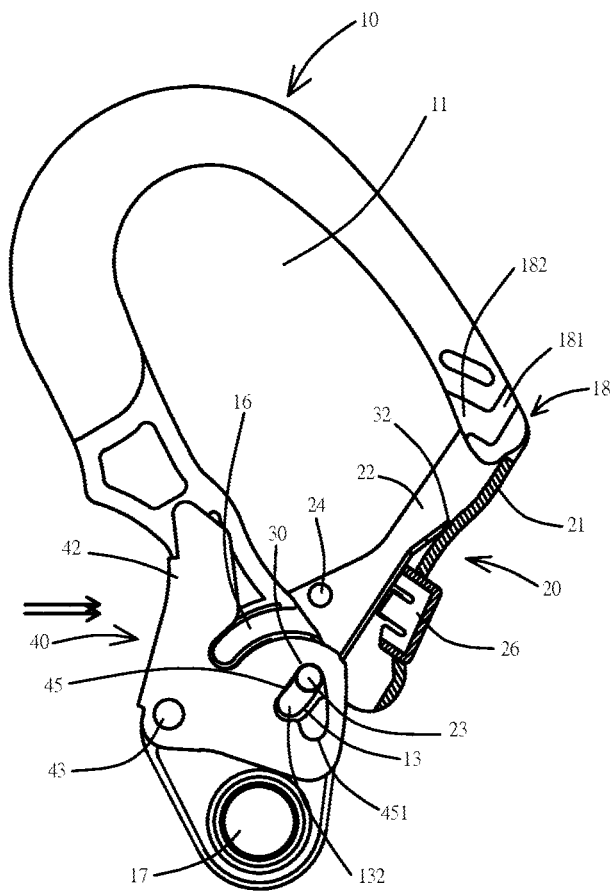
FIG. 6 is a perspective view of the first part operation of pressing a controlling shaft of the present invention.
Figure 7:
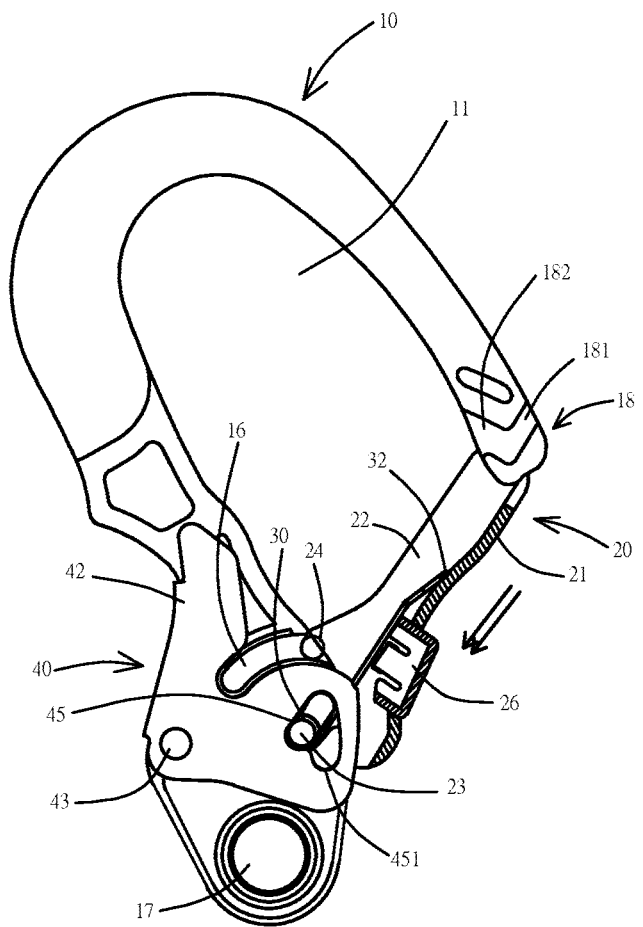
FIG. 7 is a perspective view of the second part operation of pulling a locking bar of the present invention.
Figure 8:
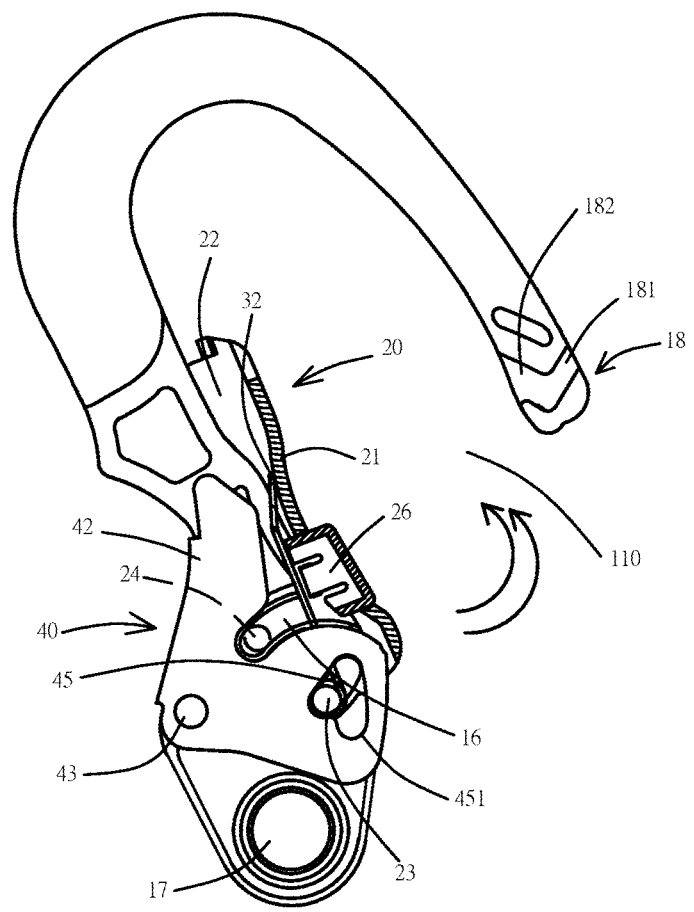
FIG. 8 is a perspective view of the third part operation of turning a locking bar to open a hook hole of the present invention.

Referring to FIG. 6, if one would like to operate the locking bar 20 to open the hook opening 110 of the present invention, the first part operation is to press on the controlling shaft 40 for driving the controlling shaft 40 to swing to the fourth position against the second spring 50, which causes the buckling portion 45 to release the first bolt 23. Referring to FIG. 7, the second part operation to the locking bar 20 is to let the locking bar 20 linkingly move the first bolt 23 to the second position 132 and the block 222 will move in the guiding groove 182. Lastly, referring to FIG. 8, the third part operation is to force the locking bar 20 to overcome the predetermined elasticity from the first spring 30 to allow the locking bar 20 to turn counterclockwise toward the hook hole 11 to be out of the guiding groove 182, so as to complete the three-part operation mode for opening the hook opening 110.

Hence, the present invention at least has the following progresses:

First, the hook hole of the present invention can only be opened with the three-part operation of the controlling shaft 40 and the locking bar 20, which can certainly further prevent the unhooking issue caused by unintended contact to the controlling shaft, and be applied to enhance the safety protection thereof.

Second, when the locking bar 20 of the present invention is side bumped, an end of the locking bar 20 can pass part of the stress to the hook 10 through the spacing portion 23, the other end of the locking bar 20 can pass part of the stress to the hook 10 through the block 222, and the first spring 30 can also absorbs part of the stress, so the present invention really has an advancement of dispersing stress, so as to enlarge the hook opening 110 and lengthen the locking bar 20 in the manner that the requirements for structural safety are also met, so that the operations of hooking and unhooking are made to be more smooth and efficient.

All in all, the overall structural characteristic of the present invention can be unprecedented in all current structures, which is also an excellent and outstanding design that similar invention or publish have both never been found in the same category. Therefore the present invention meets the application requirements of patent of an invention, and is lawfully submitted to apply for the patent accordingly.

However, the above descriptions are only a preferred embodiment of the present invention, but not to be used to confine the scope of embodying the present invention, which means all equivalent varieties and modifications based on the appended claims of the present invention are within the scope of the present invention.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A triple locking hook connector, comprising:
    a hook comprising a hook hole penetrated thereof, wherein said hook hole has a hook opening connecting through a side of said hook, wherein said hook has a first groove, an axle hole penetratingly on an edge of an end of said hook opening, and a spacing portion on an edge of the other end of said hook opening;
    a locking bar having a first bolt on an edge of an end thereof passing through said first groove, so as to allow said locking bar to shift between a first position and a second position along said first groove, wherein when the first bolt is at said first position, a free end of said locking bar will be positioned at said spacing portion, wherein when said first bolt is at said second position, said free end of said locking bar will be positioned at a place to release said spacing portion;
    a first spring arranged between said hook and said locking bar to drive said first bolt to remain at said first position and to drive said free end of said locking bar to remain at said spacing portion;
    a controlling shaft having a buckling portion and joining said axle hole via a main axle for swinging between a third position and a fourth position, wherein said controlling shaft at said third position causes said buckling portion to restrict said first bolt to remain at said first position, wherein said first bolt is freed when said controlling shaft is at said fourth position; and
    a second spring arranged between said hook and said controlling shaft to drive said controlling shaft to remain at said third position, so as to ensure that said locking bar shuts said hook opening, wherein to open said hook opening, said controlling shaft should be driven to swing said fourth position to allow said locking bar to be pulled to move said first bolt to said second position, which then forces said locking bar to turn toward said hook hole to make a three-part mode for opening said hook opening.

2. The triple locking hook connector, as recited in claim 1, wherein said hook was defined said first position close to said hook opening in said first groove, and said second position away from said hook opening, wherein said hook further has a second groove which connects through said hook hole in a manner that refers said second position as a center of circle, wherein the other end of said locking bar is further set a second bolt which stay in said hook hole when said first bolt is at said first position, wherein when said first bolt is at said second position, said second bolt will be at a position for entering said second groove, wherein when said locking bar swings toward said hook hole in a manner that refers said second position as a center of circle, said second groove is made to restrict said second bolt.

3. The triple locking hook connector, as recited in claim 2, wherein said locking bar has a locking plate for closing said hook opening, wherein the front and back sides of said locking plate further symmetrically fold a side plate respectively, wherein an edge of an end of each of said side plate has a first hole for installing said first bolt and a second hole in a proper position for installing said second bolt.

4. The triple locking hook connector, as recited in claim 3, wherein a thickness was defined between said front and back sides of said hook, wherein a first dowel protruding from said front and back sides was arranged in between said axle hole and said first groove, wherein said first spring circles and said first bolt are extended a first pressure foot flexibly propping on said first dowel and a second pressure foot capable of pushing said locking plate with a predetermined elasticity.

5. The triple locking hook connector, as recited in claim 3, wherein said controlling shaft has an end plate set on an outer side of said hook, wherein the front and back sides of said end plate further symmetrically fold a cover plate respectively, wherein said two cover plate respectively has a third hole opposite to the position of said axle hole for installing said main axle.

6. The triple locking hook connector, as recited in claim 5, wherein said two cover plates symmetrically penetratingly have a buckling portion of a heart-shaped groove, wherein when both ends of said first bolt are inserted into said buckling portion and when said controlling shaft is at said third position, a hollow groove of a side of said buckling portion can be induced to restrict said first bolt in said first position, wherein when said controlling shaft is at said fourth position, said hollow groove can be induced to release said first bolt, so that said first bolt can move between said first position and said second position along the other side of said buckling portion.

7. The triple locking hook connector, as recited in claim 5, wherein a thickness was defined between said front and back sides of said hook, wherein a second dowel protruding from said front and back sides was arranged in between said axle hole and said first groove, wherein said second spring circles two rims of said axle hole and is extended a third pressure foot flexibly propping on said second dowel and a fourth pressure foot capable of pushing said end plate with a predetermined elasticity.

8. The triple locking hook connector, as recited in claim 3, wherein said locking bar was assembled with a flipping portion for the uses of pulling and turning said locking bar.

9. The triple locking hook connector, as recited in claim 2, wherein said locking bar was assembled with a flipping portion for the uses of pulling and turning said locking bar.

10. The triple locking hook connector, as recited in claim 1, wherein a thickness was defined between the front and back sides of said hook, wherein said front and back sides further have said spacing portion dented on an edge of the other end of said hook opening symmetrically, wherein said spacing portion is formed by a crossing buckling groove and guiding groove, wherein said buckling groove axially matches said first groove, wherein said guiding groove connects said buckling groove with said hook hole in a slant direction, wherein said locking bar has a locking plate for closing said hook opening, wherein the front and back sides of said locking plate further symmetrically fold a side plate respectively, wherein an edge of an end of each of said side plate has a first hole for installing said first bolt, wherein the other end of said locking bar was foldingly set a block opposite to said two side plates, so that when said first bolt is at said first position, said block can be linked to move via said guiding groove and be positioned in said buckling groove for letting said locking bar to lock said hook opening, while when said locking bar linkingly move said first bolt to said second position, said block will move in said guiding groove and make said free end of said locking bar under a position to release said spacing portion.

11. The triple locking hook connector, as recited in claim 10, wherein a thickness was defined between said front and back sides of said hook, wherein a first dowel protruding from said front and back sides was arranged in between said axle hole and said first groove, wherein said first spring circles and said first bolt are extended a first pressure foot flexibly propping on said first dowel and a second pressure foot capable of pushing said locking plate with a predetermined elasticity.

12. The triple locking hook connector, as recited in claim 10, wherein said controlling shaft has an end plate set on an outer side of said hook, wherein the front and back sides of said end plate further symmetrically fold a cover plate respectively, wherein said two cover plate respectively has a third hole opposite to the position of said axle hole for installing said main axle.

13. The triple locking hook connector, as recited in claim 12, wherein said two cover plates symmetrically penetratingly have a buckling portion of a heart-shaped groove, wherein when both ends of said first bolt are inserted into said buckling portion and when said controlling shaft is at said third position, a hollow groove of a side of said buckling portion can be induced to restrict said first bolt in said first position, wherein when said controlling shaft is at said fourth position, said hollow groove can be induced to release said first bolt, so that said first bolt can move between said first position and said second position along the other side of said buckling portion.

14. The triple locking hook connector, as recited in claim 12, wherein a thickness was defined between said front and back sides of said hook, wherein a second dowel protruding from said front and back sides was arranged in between said axle hole and said first groove, wherein said second spring circles two rims of said axle hole and is extended a third pressure foot flexibly propping on said second dowel and a fourth pressure foot capable of pushing said end plate with a predetermined elasticity.

15. The triple locking hook connector, as recited in claim 10, wherein said locking bar was assembled with a flipping portion for the uses of pulling and turning said locking bar.

16. The triple locking hook connector, as recited in claim 1, wherein said locking bar was assembled with a flipping portion for the uses of pulling and turning said locking bar.

* * * * *